United States Patent
Kim et al.

(10) Patent No.: US 12,335,822 B2
(45) Date of Patent: Jun. 17, 2025

(54) COMMUNICATION DEVICE, COMPUTER PROGRAM PRODUCT, AND COMMUNICATION SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Suh Wuk Kim, Tokyo (JP); Hiroki Kudo, Kawasaki Kanagawa (JP); Yasuyuki Tanaka, Kawasaki Kanagawa (JP); Masaki Nishio, Yokohama Kanagawa (JP); Yuma Nogami, Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 340 days.

(21) Appl. No.: 17/823,504

(22) Filed: Aug. 30, 2022

(65) Prior Publication Data

US 2023/0118366 A1    Apr. 20, 2023

(30) Foreign Application Priority Data

Oct. 14, 2021    (JP) .................................. 2021-168582

(51) Int. Cl.
*H04W 4/38*     (2018.01)
*H04W 72/0446*  (2023.01)
*H04W 88/04*    (2009.01)

(52) U.S. Cl.
CPC ......... *H04W 4/38* (2018.02); *H04W 72/0446* (2013.01); *H04W 88/04* (2013.01)

(58) Field of Classification Search
CPC ................................ H04W 4/38; H04W 72/04
See application file for complete search history.

(56) References Cited

U.S. PATENT DOCUMENTS

| | | | |
|---|---|---|---|
| 2007/0195748 A1* | 8/2007 | Radulescu | H04L 47/70 370/351 |
| 2015/0264628 A1* | 9/2015 | Wen | H04W 72/0446 370/315 |

(Continued)

FOREIGN PATENT DOCUMENTS

| JP | 2008-048027 A | 2/2008 |
|---|---|---|
| JP | 2010-124163 A | 6/2010 |

(Continued)

OTHER PUBLICATIONS

Japan Patent Office, Office Action in JP App. No. 2021-168582, 4 pages, and machine translation, 7 pages (Jan. 7, 2025).

(Continued)

*Primary Examiner* — Zhiren Qin
(74) *Attorney, Agent, or Firm* — Finnegan, Henderson, Farabow, Garrett & Dunner, LLP

(57) ABSTRACT

A communication device according to one embodiment includes one or more hardware processors. The processors serve to acquire, from at least one electronic device, output data output from the electronic device. The processors serve to communicate with a server device by a communication technique in which numbers indicating communication timings are synchronized. The processors also serve to transmit, to the server device as a destination, the output data in association with a first number out of the numbers. The first number indicates a timing at which the output data is acquired.

6 Claims, 12 Drawing Sheets

(56) References Cited

U.S. PATENT DOCUMENTS

| | | | |
|---|---|---|---|
| 2016/0057561 A1 | 2/2016 | Kami | |
| 2016/0262102 A1* | 9/2016 | Sakata et al. | |
| 2018/0278350 A1* | 9/2018 | Nishi | H04B 17/40 |
| 2019/0098035 A1* | 3/2019 | Periaswamy | G05B 19/0428 |
| 2019/0149957 A1* | 5/2019 | Raza | H04W 40/023 |
| | | | 370/312 |
| 2019/0155769 A1* | 5/2019 | Levy | G06F 13/38 |
| 2019/0252919 A1 | 8/2019 | Ogawa et al. | |
| 2022/0021471 A1 | 1/2022 | Kim et al. | |

FOREIGN PATENT DOCUMENTS

| | | |
|---|---|---|
| JP | 2010-233073 A | 10/2010 |
| JP | 5849829 B2 | 2/2016 |
| JP | 2016-163305 A | 9/2016 |
| JP | 5998909 B2 | 9/2016 |
| JP | 2016-219872 A | 12/2016 |
| JP | 2017-139629 A | 8/2017 |
| JP | 2018-121366 A | 8/2018 |
| JP | 6398359 B2 | 10/2018 |
| JP | 2019-140799 A | 8/2019 |
| JP | 2022-20453 A | 2/2022 |
| KR | 10-2011-0073803 A | 6/2011 |
| WO | WO 2014/157240 A1 | 10/2014 |

OTHER PUBLICATIONS

Japan Patent Office, Office Action in JP App. No. 2021-168582, 4 pages, with machine translation, 7 pages (Apr. 8, 2025).

* cited by examiner

| NODE IDENTIFIER | GENERATION TIME | SENSOR DATA |
|---|---|---|
| $100_1$ | 12:00:00 | VALUE SD1 |
| $100_1$ | 12:00:00 | VALUE SD2 |
| $100_2$ | 12:00:00 | VALUE SD3 |
| ⋮ | ⋮ | ⋮ |
| $100_{13}$ | 12:30:00 | VALUE SD4 |
| $100_1$ | 12:30:00 | VALUE SD5 |

FIG.6

| NUMBER | GENERATION TIME | SENSOR DATA S1 | ... | SENSOR DATA SN |
|---|---|---|---|---|
| 1 | 12:00:00 | VALUE SD11 | ... | VALUE SDN1 |
| 2 | 12:10:00 | VALUE SD12 | ... | VALUE SDN2 |
| 3 | 12:20:00 | VALUE SD13 | ... | VALUE SDN3 |
| 4 | 12:30:00 | VALUE SD14 | ... | VALUE SDN4 |
| 5 | 12:40:00 | VALUE SD15 | ... | VALUE SDN5 |
| 6 | 12:50:00 | VALUE SD16 | ... | VALUE SDN6 |

COMMUNICATION DEVICE, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2021-168582, filed on Oct. 14, 2021; the entire contents of which are incorporated herein by reference.

FIELD

Embodiments described herein relate generally to a communication device, a computer program product, and a communication system.

BACKGROUND

There has been proposed a communication system that collects sensor data acquired by sensors connected to communication devices (nodes), respectively, from the communication devices over a network. The sensor data is collected, in some cases, via data loggers serving to record the sensor data acquired from the sensors connected thereto.

Sensor data is managed in association with a time at which the sensor data is acquired. For example, the communication device may be configured to acquire a sensing time from the data logger, or determine a time at which the data is acquired from the data logger by using a clock in the communication device itself, and transmit the acquired or determined time in association with the sensor data to a wireless network.

However, in the above-described technology, the data indicating a time is transmitted, so that there is a problem that amount of data required for transmission increases.

BRIEF DESCRIPTION OF THE DRAWINGS

FIG. 6 is a diagram illustrating an example of a sensor data recording method;

DETAILED DESCRIPTION

A communication device according to an embodiment includes one or more hardware processors. The one or more processors serve to acquire, from at least one electronic device, output data output from the electronic device. The processors serve to communicate with a server device by a communication technique in which numbers indicating communication timings are synchronized. The processors also serve to transmit, to the server device as a destination, the output data in association with a first number out of the numbers. The first number indicates a timing at which the output data is acquired.

Hereinafter, a communication device, a communication method, a computer program product, and a communication system according to preferred embodiments of the present invention will be described in detail with reference to the accompanying drawings.

As described above, the technology, in which a time is transmitted in association with sensor data, has a problem that an amount of data increases. In addition, for example, the time managed by the data logger may deviate, so that a sensing time notified by the data logger may be inaccurate. It is possible to configure the data logger to correct the time on the basis of a global positioning system (GPS) reception function. However, in such a configuration, there is a possibility that the function of the data logger may be complicated and the power consumption may increase.

The communication system according to the present embodiment communicates with a server device (collection device) by a communication technique in which numbers indicating communication timings are synchronized. The communication system uses, in place of a time at which sensor data is generated, one of the numbers indicating the communication timings, which corresponds to a time at which the sensor data is acquired.

Hereinafter, an example of a communication system that collects sensor data (an example of output data) output from a data logger (an example of an electronic device) will be mainly described. The applicable communication system is not limited thereto, and the electronic device and the output data may be any device and any data. For example, the communication system may be configured to collect sensor data output from a sensor (an example of an electronic device), rather than collecting sensor data through a data logger. In addition, for example, the following output data may be used.

Figure 1:
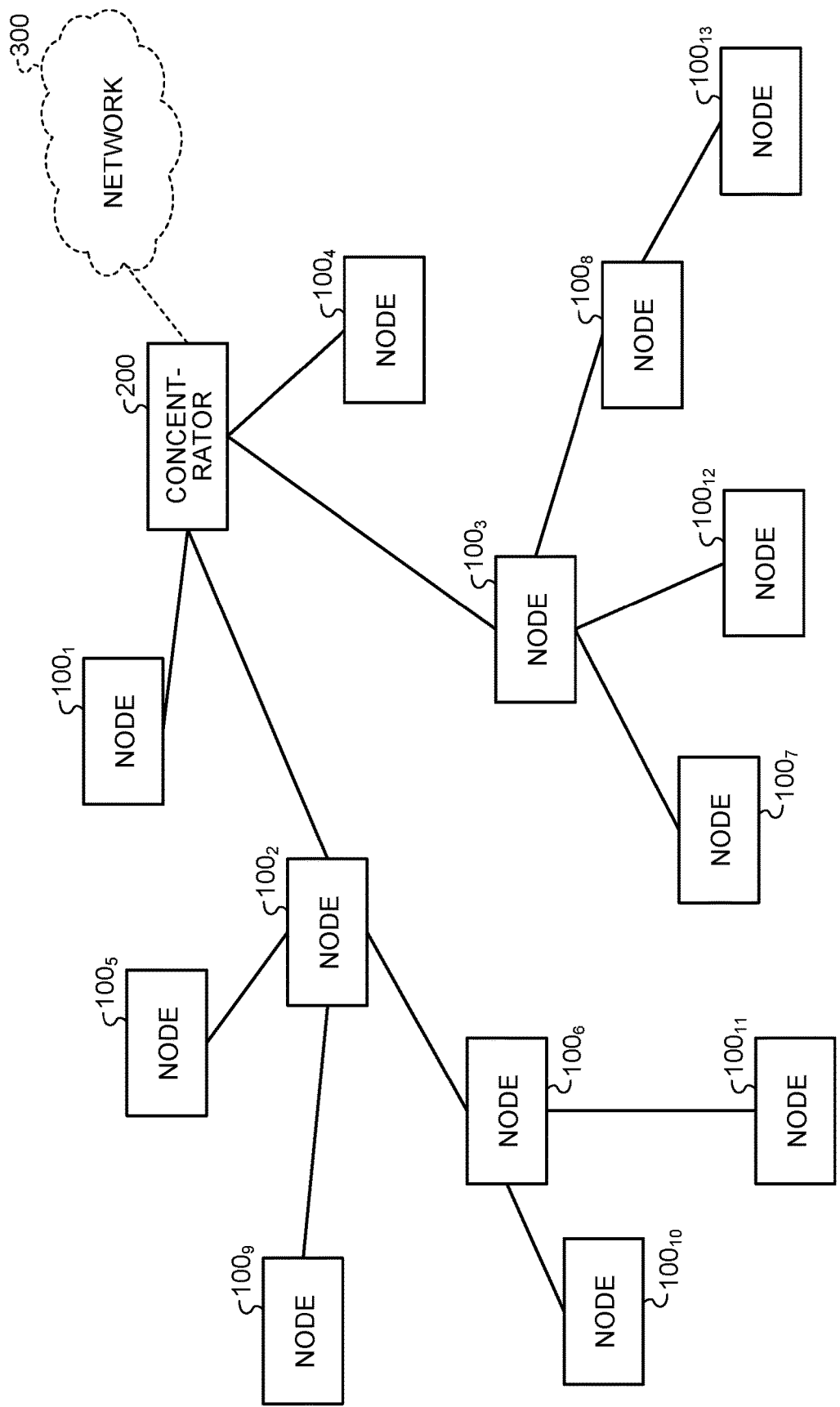
FIG. 1 is a configuration diagram of a communication system according to the present embodiment.

- voltage data indicating a voltage of a battery built in or connected to an electronic device
- latitude data and longitude data obtained by a GPS reception function of an electronic device
- warning data indicating that certain data (sensor data) has greatly changed FIG. 1 is a diagram illustrating a configuration example of the communication system according to the present embodiment. As illustrated in FIG. 1, the communication system according to the present embodiment includes a concentrator 200 (an example of a server device) and more than one nodes $100_1$ to $100_{13}$ (an example of a communication device).

Each of the nodes $100_1$ to $100_{13}$ transmits sensor data, which is acquired by a sensor connected thereto through a data logger (or a built-in sensor), to the concentrator 200. The nodes $100_1$ to $100_{13}$ can have the same configuration as one another. Therefore, the nodes $100_1$ to $100_{13}$ may be simply referred to as nodes 100 in a case where they do not need to be distinguished from each other. The number of nodes 100 is not limited to thirteen, and may be any number.

The concentrator 200 is a device (aggregation device) serves to aggregate sensor data transmitted from each of the nodes 100.

The concentrator 200 and the nodes $100_1$ to $100_{13}$ constitute a wireless multi-hop network. Communication in the wireless multi-hop network is controlled by, for example, a time-division multiplexing technique. While the wireless communication technique may be any technique, IEEE 802.11, IEEE 802.15.4, or the like can be applied, for example.

The concentrator 200 may be connected to a network 300 in addition to the wireless multi-hop network. The network 300 may be in any network, for example, a wide area network such as the Internet, a closed network in a wide area, or a local network such as an intra-company network.

Connection between the concentrator 200 and the network 300 may be wired connection using an Ethernet (registered trademark) cable, an optical fiber, or the like, or may be wireless connection using a mobile phone network or a satellite line. The connection to the network 300 is not essential, and the communication system may be constituted by a wireless multi-hop network only including the concentrator 200 and the nodes $100_1$ to $100_{13}$.

Note that the network 300 may be connected to, for example, a server device serving to collect sensor data from two or more concentrators 200 and execute processing using the collected sensor data.

The outline of sensor data collection processing performed by the communication system according to the present embodiment will be described.

A data logger is connected to the node 100. A sensor is connected to the data logger. The node 100 obtains new sensor data from the data logger in a polling manner, for example. At this time, the node 100 obtains the sensor data itself and data indicating a sensing time of the sensor data. The sensing time is, for example, a time at which the sensor data is recorded in the data logger, but is not limited thereto. For example, in a case where the sensor is preheated, the sensing time may be a time at which the pre-heating is started. The pre-heating is processing for warming the sensor for a certain period of time in a state where power is supplied to the sensor before data is obtained from the sensor. For example, it is assumed here that the pre-heating is started at 10:00:00, the pre-heating is completed at 10:00:20, and the sensor data is recorded in the data logger at 10:00:20. In this case, 10:00:00 is recorded as a sensing time in the data logger.

The node 100 needs to wirelessly transmit data corresponding to these two kinds of data (the sensor data and the sensing time), but it is preferable to reduce an amount of data as much as possible. It is preferable to reduce, for example, an amount of data indicating the sensing time. Note that, in the following description, data in a format of indicating a time used in daily life (an actual time to be described later), such as "2021/08/23 11:30:00.000", may be referred to as "time data".

The node 100 according to the present embodiment transmits, as data indicating a sensing time, a number (a number indicating a communication timing) already used in the wireless multi-hop network to implement time-division multiplexing communication, in place of time data.

Time-slotted channel hopping (TSCH) or the like can be applied as a time-division multiplexing technique. The number indicating the communication timing is, for example, a time slot number (an absolute slot number (ASN)), a slot frame number, a super frame number, or the like.

The node 100 polls the data logger at the beginning of each time slot to check whether new sensor data has been obtained. When there is new data, the node 100 wirelessly transmits the obtained sensor data along with a current time slot number.

In a case where the node 100 relays sensor data transmitted from another node 100 (an example of an external communication device) to the concentrator 200, the node 100 may collectively transmit the sensor data having the same time slot number. Specifically, a message to be transmitted wirelessly is generated in such a manner that pieces of sensor data are associated with only one time slot number in the message. As a result, it is possible to further reduce an amount of data to be transmitted.

In a case where the time of the data logger greatly deviates for some reason, there is a possibility that the correct time at which the sensor data is recorded may be unclear in a configuration in which time data itself is transmitted. On the other hand, in a configuration in which a time slot number is transmitted as data indicating a sensing time as in the present embodiment, it is possible to detect a correct time at which sensor data is recorded by converting the received time slot number into a time.

For example, it is assumed here that the data logger is set to perform sensing at 0 minute and at 30 minutes after the hour every hour and record sensing data in a storage medium (hereinafter, an internal memory) provided inside. Even if the time managed by the data logger deviates by 2 minutes and sensing is actually performed at 2 minutes and at 32 minutes after the hour every hour, the data logger cannot recognize that the time has deviated. For this reason, the data logger transmits time data indicating 0 minute or 30 minutes after the hour every hour in association with sensor data. The device that has received the sensor data associated with the time data indicating 0 minute or 30 minutes after the hour every hour cannot recognize that the actual sensing time is 2 minutes or 32 minutes after the hour every hour.

In contrast, according to the present embodiment, a number indicating a communication timing used in the communication technique for the wireless multi-hop network is transmitted in place of the time data. Therefore, if a polling interval (an example of a designated time interval) or a time interval represented by numbers indicating communication timings (e.g., a time slot length) is appropriately set, it is possible to minimize an error between a time corresponding to the number and an actual sensing time. For example, in a case where the polling interval or the time interval represented by the numbers indicating the communication timings is 30 seconds, the error of the transmitted sensing time with respect to the actual sensing time can be within 30 seconds.

Figures 2, 3:
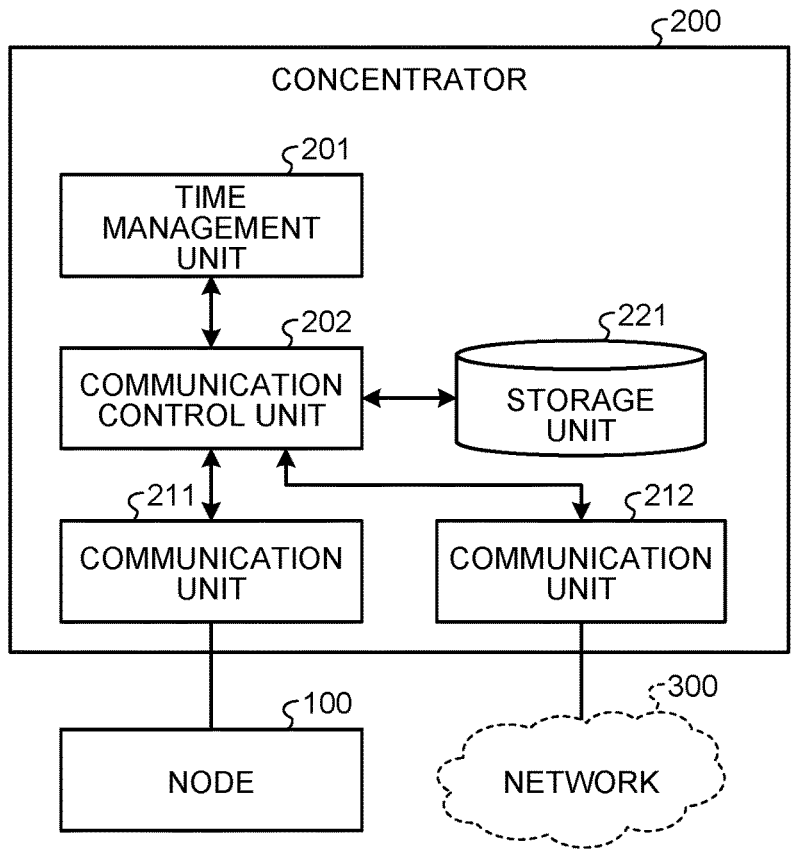
FIG. 2 is a functional block diagram of a concentrator.
FIG. 3 is a diagram illustrating an example of a data structure of sensor data.

Next, a functional configuration example of the concentrator 200 will be described. FIG. 2 is a block diagram illustrating an example of a functional configuration of the concentrator 200. As illustrated in FIG. 2, the concentrator 200 includes a time management unit 201, a communication control unit 202, communication units 211 and 212, and a storage unit 221.

The storage unit 221 stores various kinds of data used in the concentrator 200. For example, the storage unit 221 stores sensor data transmitted from each node 100 and data to be transmitted to each node, for example, control information. In a case where sensor data is stored and managed by a storage device outside the concentrator 200, the storage unit 221 does not need to be provided in the concentrator 200.

The storage unit 221 can be formed of any generally used storage medium such as a flash memory, a memory card, a random access memory (RAM), a hard disk drive (HDD), or an optical disc.

The communication unit 211 communicates with each node 100 and constitutes a wireless multi-hop network. The communication performed in the wireless multi-hop network is controlled by the time-division multiplexing technique as described above, so that the communication unit 211 operates to switch processing for each time slot. That is, the communication unit 211 performs transmission processing in a time slot in which the communication unit is capable of transmitting data, and performs reception processing in a time slot in which the communication unit needs to stand by to receive data. In a case where there is no data to be transmitted in spite of a time slot in which the communication unit is capable of transmitting data, and in a time slot in which the communication unit is capable of neither transmission nor reception, the communication unit 211 does not perform any operation. In a time slot in which neither transmission processing nor reception processing is performed, the communication unit 211 can transition to an ultra-low power consumption mode, a power-off mode, or the like to stop the operation. In a period during which the communication unit 211 does not perform any operation, the entire concentrator 200 may also operate in the ultra-low power consumption mode.

The communication unit 212 is used for communication with the network 300. When the concentrator 200 is not connected to the network 300, the communication unit 212 does not need to be provided in the concentrator 200.

The time management unit 201 manages a current time as an actual time. The actual time refers to a time used in daily life whose one day is 24 hours. The time management unit 201 may acquire the current time by any means. For example, the following means can be applied.

Obtaining current time information from a time server on the network 300

Obtaining current time information by a GPS

Obtaining current time information from a base station of a mobile phone

Inputting a current time by a person manually

It is assumed that the time management unit 201 can acquire current time information at an appropriate frequency in accordance with an accuracy of a crystal oscillator (clock) of the concentrator 200, and always hold a current time within an error range in which there is no problem in practical use during an operation to be described below.

For example, it is assumed that, although the concentrator 200 does not have an accurate current time immediately after shipment from a factory and immediately after power is turned on, the time management unit 201 can recognize that such a concentrator 200 does not have a current time. While not having current time information, the concentrator 200 does not perform an operation to be described below. For example, it is assumed that, when current time information is acquired, the concentrator 200 starts an operation to be described below. Once the current time information is acquired, the concentrator 200 may or may not continue to acquire current time information at a predetermined timing (such as after a certain period of time elapses). In a case where current time information is continuously acquired at a predetermined timing, the concentrator 200 may operate "with no current time information" when the concentrator 200 fails to acquire current time information, or the concentrator 200 may continue to operate "with time information".

The communication control unit 202 controls communication between the node 100 and the network 300. For example, the communication control unit 202 switches the operation of the communication unit 211 as described above in accordance with a time-division multiplexing schedule. Moreover, the communication control unit 202 establishes and maintains a wireless multi-hop network, and receives and transfers sensor data transmitted via the wireless multi-hop network. In a case where the concentrator 200 is connected to the network 300, the communication control unit 202 may or may not transfer the sensor data received via the communication unit 212 to the network 300. Moreover, the communication control unit 202 may or may not store the sensor data in the storage unit 221. Moreover, the communication control unit 202 may or may not transfer the sensor data stored in the storage unit 221 to the network 300. Moreover, the communication control unit 202 transmits control information or the like to the node 100.

FIG. 3 is a diagram illustrating an example of a data structure of sensor data stored in the storage unit 221. The sensor data is stored in association with a node identifier and a generation time. The node identifier is an example of identification information for identifying the node 100 from which the sensor data is transmitted. The generation time is a time at which the sensor data is acquired (generated).

The sensor data to be transmitted to the concentrator 200 includes not only a value (read value) acquired from the sensor but also a number (for example, a time slot number) indicating a communication timing at which the value is acquired. The concentrator 200 calculates an actual time corresponding to the time slot number included in the sensor data by using the time management unit 201 and the communication control unit 202. This processing makes it possible to manage the sensor data together with the generation time. The concentrator 200 may treat a time slot number as it is as a generation time without converting the generation time into an actual time. In addition, a time at which concentrator 200 receives each piece of sensor data can also be managed in the same manner, but an associated reception time may or may not be recorded in the storage unit 221.

The above-described units (the time management unit 201 and the communication control unit 202) are implemented by, for example, one or more hardware processors. Each of the above-described units may be implemented by causing the processor such as a central processing unit (CPU) to execute a computer program, that is, implemented by software. The Each of the above-described units may be implemented by the processor such as a dedicated integrated circuit (IC), that is, implemented by hardware. Each of the above-described units may be implemented by software and hardware in combination. In a case where plural processors are used, each of the processors may implement one of the units, or may implement two or more of the units.

Figure 4:
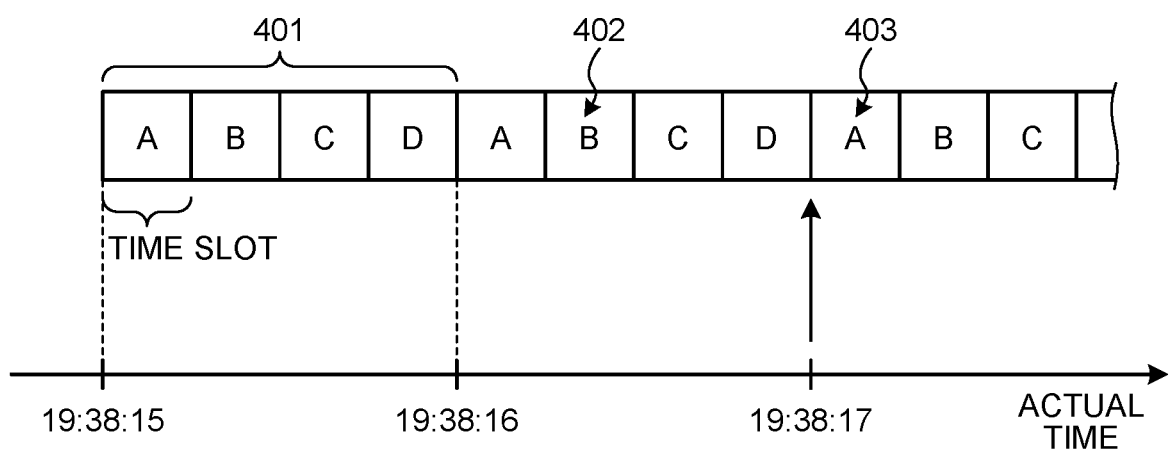
FIG. 4 is a diagram illustrating a relationship between an actual time and a time-division multiplexing time slot.

An example of control of time-division multiplexing communication performed by the communication control unit 202 will be described. FIG. 4 is a diagram illustrating a relationship between an actual time and a time-division multiplexing time slot. As illustrated in FIG. 4, it is assumed that the concentrator 200 starts the wireless multi-hop network at 19:38:15. One time slot has a length of 250 milliseconds, and four time slots constitute a unit 401 of a time-division multiplexing schedule. Thus, if the schedule does not change after 19:38:15, the same communication schedule is repeated every second. A, B, C, and D represent four schedules to be executed every second.

Each time slot is assigned a time slot number. In the example of FIG. 4, assuming that a time slot number of a time slot immediately after the concentrator 200 starts the wireless multi-hop network is an integer n, a time slot number n+5 is assigned to a sixth time slot 402 from the top. For example, if the time slot number n of the initial time slot (the time slot corresponding to the left end "A" in FIG. 4) is "0", the time slot number of the time slot 402 is "5". Basically, the time slot number monotonically increases. In a case where there is an upper limit value for the time slot number, the time slot number returns to "0" after reaching the upper limit value, and monotonically increases again.

Such time-division multiplexing communication schedules and time slot numbers are managed by the communication control unit 202 of the concentrator 200. The communication control unit 202 can associate an actual time and a time slot number with each other by obtaining a current time from the time management unit 201. In the example of FIG. 4, the communication control unit 202 can determine that a time slot 403 whose time slot number is n+8 starts at 19:38:17.

Figure 5:
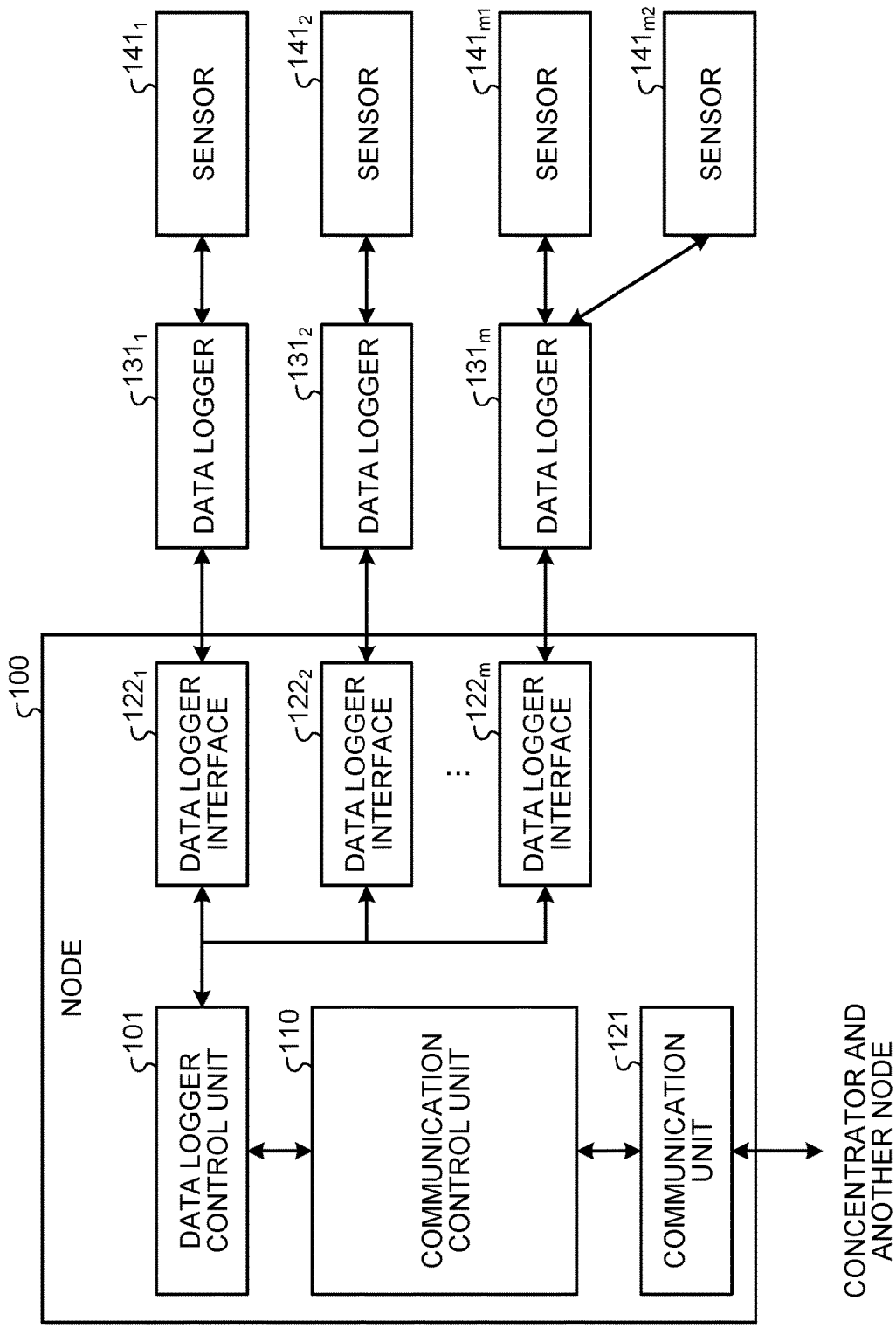
FIG. 5 is a functional block diagram of a node.

Next, a configuration of the node 100 will be described. FIG. 5 is a block diagram illustrating an example of a functional configuration of the node 100. As illustrated in FIG. 5, the node 100 includes a data logger control unit 101 (an example of an acquisition control unit), a communication control unit 110, a communication unit 121, and one or more data logger interfaces $122_1$ to $122_m$ (m is an integer of 1 or more).

The data logger interfaces $122_1$ to $122_m$ are connected to data loggers $131_1$ to $131_m$, respectively. Any of the sensors $141_1$ to $141_{m2}$ is connected to each of the data loggers $131_1$ to $131_m$.

The data logger interfaces $122_1$ to $122_m$ are simply referred to as data logger interfaces 122 in a case where they do not need to be distinguished from each other. Also, the data loggers $131_1$ to $131_m$ are simply referred to as data loggers 131 in a case where they do not need to be distinguished from each other. Similarly, the sensors $141_1$ to $141_{m2}$ are simply referred to as sensors 141 in a case where they do not need to be distinguished from each other.

The sensor 141 is an electronic device serves to output, as sensor data, a result of detecting a predetermined physical quantity. The physical quantity to be detected may be any physical quantity. The data logger 131 is an electronic device that operates as a data recording device that records sensor data detected by the sensor 141 in a storage medium (internal memory).

One or more sensors 141 are connected to each of the data loggers 131. In FIG. 5, as an example, while one sensor 141 (the sensor $141_1$ or the sensor $141_2$) is connected to each of the data loggers $131_1$ and $131_2$, two sensors $141_{m1}$ and $144_{m2}$ are connected to the data logger $131_m$, but the connection topology between the data loggers 131 and the sensors 141 is not limited to this example.

The communication unit 121 operates similarly to the communication unit 211 of the concentrator 200.

As in the communication control unit 202 of the concentrator 200, the communication control unit 110 switches the operation of the communication unit 121 in accordance with a time-division multiplexing communication schedule. Moreover, the communication control unit 110 discovers and connects a wireless multi-hop network started by the concentrator 200, and sets and changes a communication path, a communication schedule, and the like. For these operations, the communication control unit 110 transmits and receives a control frame including a beacon to and from another node 100 via the communication unit 121.

The communication control unit 110 also controls communication with another node 100 constituting the wireless multi-hop network. For example, the communication control unit 110 receives, from another node 100, sensor data acquired by this node 100. Moreover, the communication control unit 110 manages data to be transmitted to another node 100 or the concentrator 200, and generates a transmission message. For example, the communication control unit 110 transmits, to the concentrator 200 as a destination, sensor data associated with a time slot number when the sensor data is acquired (an example of a first number indicating a timing at which data is acquired).

Nodes 100 other than nodes 100 directly connected to the concentrator 200 (the nodes $100_1$ to $100_4$ in FIG. 1) transmit sensor data to the concentrator 200 via another node 100 as a relay device serving to relay communication with the concentrator 200.

The data logger control unit 101 functions as an acquisition control unit to acquire, from the data logger 131, sensor data output from the data logger 131. For example, the data logger control unit 101 reads a number of latest sensor data or the latest sensor data itself recorded on the internal memory of the data logger 131 via the data logger interface 122. This processing is called polling.

For example, when recording sensor data in the internal memory, the data logger 131 may assign, to the sensor data, a number as information for identifying the sensor data. FIG. 6 is a diagram illustrating an example of a method of recording sensor data to which a number is assigned as described above. FIG. 6 illustrates an example of a case where N sensors 141 (N is an integer of 1 or more) are connected to a certain data logger 131, and sensor data SN is acquired from each of the sensors 141. The data logger 131 calculates a number by adding 1 whenever sensor data is obtained, assigns the calculated number to the sensor data, and records the sensor data to which the number is assigned in the internal memory.

When an upper limit value is set to the number and a value calculated by adding 1 reaches the upper limit value, the existing number may be overwritten thereafter. For example, after the number reaches the upper limit value, the number may be overwritten by returning to the initial value of 1. The number may be overwritten to be a value calculated by subtracting 1, starting from the upper limit value toward the initial value of 1.

The data logger 131 manages a number of the latest sensor data in this manner, and may be configured to notify the number in response to a request from the outside.

The data structure of FIG. 6 is an example, and other information may be further recorded. For example, information on year, month, day, and the like may be further recorded as the generation time. When a GPS is connected, for example, position information and the like obtained by the GPS may be further recorded.

The data logger control unit 101 may set a polling interval for each data logger interface 122, and perform polling at the set polling interval via the corresponding data logger interface 122. The data logger control unit 101 may perform polling in response to an instruction from the concentrator 200. The polling interval may be changed during operation. In a case where so-called preliminary energization or preheating is required to acquire sensor data, the data logger control unit 101 calculates back a time from a time slot in which the sensor data is acquired to start preliminary energization in advance. The preliminary energization and preheating may be controlled by the data logger 131 itself. In addition, the preliminary energization and the pre-heating do not need to be started at the time calculated back from the time slot in which the sensor data is acquired. For example, the preliminary energization and the pre-heating may be started from the time slot in which the sensor data is acquired.

Returning to FIG. 5, the data logger interface 122 can communicate with the data logger 131 to acquire data such as sensor data or make settings for the data logger 131 in accordance with a request from the data logger control unit 101. For example, at the time of polling, the data logger interface 122 acquires a number of latest sensor data or the latest sensor data itself recorded in the internal memory of the data logger 131.

Each of the above-described units (the data logger control unit 101 and the communication control unit 110) is implemented by, for example, one or more hardware processors. For example, each of the above-described units may be implemented by causing the processor such as a CPU to execute a computer program, that is, implemented by software. Each of the above-described units may be implemented by the processor such as a dedicated IC, that is, implemented by hardware. Each of the above-described units may be implemented by software and hardware in combination. In a case where plural processors are used, each of the processors may implement one of the units, or may implement two or more of the units.

Figure 7:
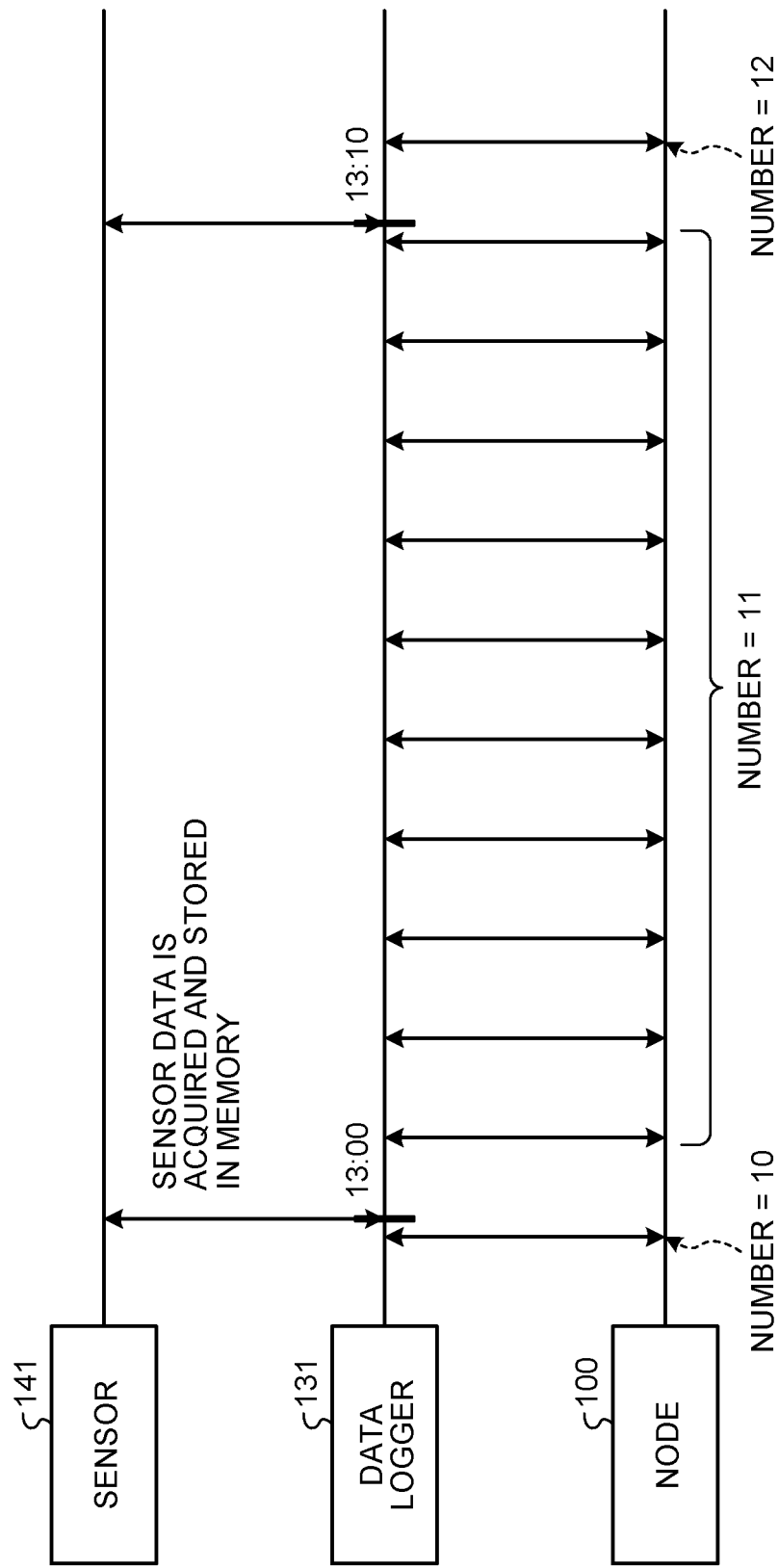
FIG. 7 is a diagram for explaining an example of polling.

Next, details of polling will be described. FIG. 7 is a diagram for describing an example of polling.

The node 100 (the data logger control unit 101) performs polling every polling interval to check whether or not new sensor data has been recorded in the data logger 131. In the example of FIG. 7, the data logger control unit 101 polls the data logger 131 every 240 time slots (the time slot has a length of 250 milliseconds), and makes a request to the data logger 131 for a number of the latest sensor data. For example, while a number "10" is obtained as the number of the latest sensor data until before the time 13:00, a number "11" is obtained as the number of the latest sensor data from the time 13:00 to 13:10.

When the sensor data number obtained from the data logger 131 is different from a previously obtained number, the node 100 can determine that new sensor data has been recorded (generated) in the data logger 131. Upon determining that new sensor data has been generated, the node 100 (the data logger control unit 101) further makes a request to the data logger 131 for sensor data corresponding to the obtained number. The node 100 transmits the obtained sensor data together with a current time slot number to the concentrator 200 as a destination.

The method for determining whether or not new sensor data has been generated is not limited thereto. For example, the data logger control unit 101 may apply a determination method that uses a generation time associated with sensor data. For example, the data logger control unit 101 makes a request to the data logger 131 for latest sensor data. When a generation time associated with the latest sensor data obtained from the data logger 131 is different from a generation time of a previously acquired sensor data, the node 100 determines that new sensor data has been generated. In a case where a change in a physical quantity to be measured is small, a determination method using the change in the measured physical quantity may be applied. For example, the data logger control unit 101 makes a request to the data logger 131 for latest sensor data. When the latest measurement physical quantity obtained from the data logger 131 is different from a previously obtained measurement physical quantity, the node 100 determines that new sensor data has been generated. As a result, transmission can be suppressed such that data is transmitted in a necessary minimum number of times.

Note that, for example, at the time of first polling after the node 100 is started up, the node 100 may or may not transmit sensor data to the concentrator 200.

As described above, the node 100 may collectively transmit pieces of sensor data to the concentrator 200. That is, the communication control unit 110 collectively, transmits to the concentrator 200, sensor data received from another node 100 and sensor data generated by the communication control unit 110 itself. Specifically, the communication control unit 110 transmits, to the concentrator 200 as a destination, pieces of sensor data whose time slot numbers are the same as one another, out of the sensor data received from another node 100 and the sensor data acquired from the data logger 131. Those pieces of sensor data are transmitted in association with the time slot number (the same time slot number).

Figure 8:
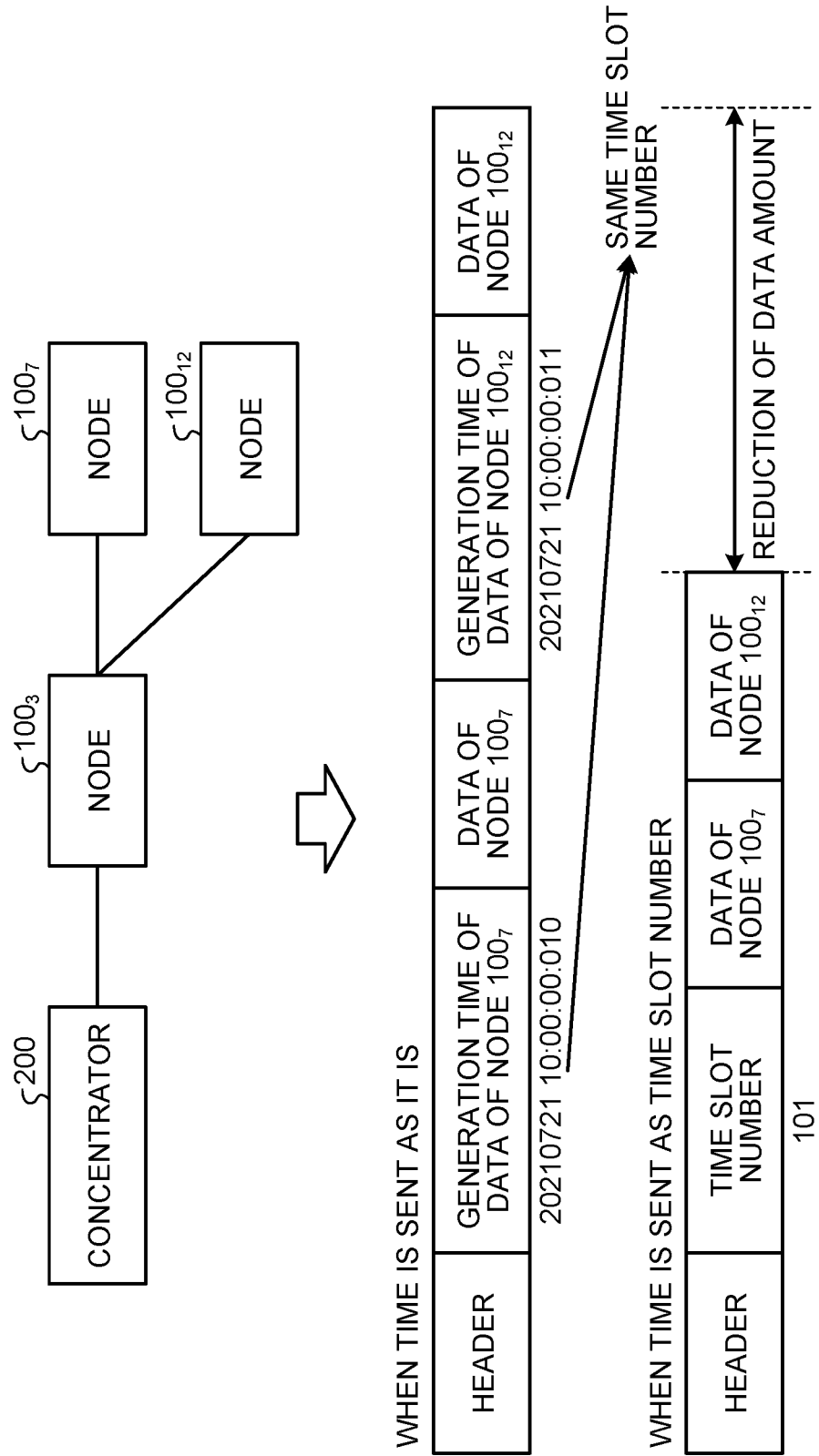
FIG. 8 is a diagram for explaining an example of processing for collectively transmitting sensor data.

FIG. 8 is a diagram for explaining an example of processing for collectively transmitting sensor data. FIG. 8 illustrates an example of a case where the node $100_3$ collectively transmits sensor data received from the nodes $100_7$ and $100_{12}$ to the concentrator 200.

The node $100_3$ relays sensor data received from the node $100_7$ and the node $100_{12}$ to transmit the sensor data to the concentrator 200. If assuming that time data itself is notified as sensor data generation times, the times at which the node $100_7$ and the node $100_{12}$ generate the sensor data may be slightly different. In such a case, the node $100_3$ cannot collectively transmit the received sensor data, so that the node $100_3$ transmits each piece of the sensor data in association with a generation time to the concentrator 200.

In contrast, as in the present embodiment, in a configuration in which a time slot number is used as data indicating a generation time, even if generation times of sensor data of the node $100_7$ and the node $100_{12}$ are slightly different from each other, the generation times may be associated with the same time slot number. In such a case, the node $100_3$ can notify the concentrator 200 of the generation times of sensor data of the node $100_7$ and the node $100_{12}$ by only inserting a time slot number corresponding to the generation times into a transmission message once. As a result, a data amount of the transmission message can be reduced.

Note that the communication control unit 110 may collect all the sensor data having the same time slot number into a single group, or may divide the sensor data having the same time slot number into some groups. For example, the communication control unit 110 may collect sensor data obtained from the same data logger interface 122 from sensor data having the same time slot number. The communication control unit 110 may collect sensor data obtained from the same type of sensors 141 from sensor data having the same time slot number. The communication control unit 110 may collect sensor data set in advance from sensor data having the same time slot number.

The sensors 141 connected to the data loggers 131 may be managed to be identified in accordance with a common rule. For example, the same identification information, such as IF1 or IF2, may be attached to one or more interfaces (including virtual interfaces) connecting one or more sensors 141 to the data loggers 131. In such a case, the communication control unit 110 may collect sensor data obtained from sensors 141 corresponding to the interfaces to which the same identification information is attached.

In some cases, sensor data transmitted from other nodes 100 may be received at different timings even if the same time slot number is associated therewith. Considering such a case, the communication control unit 110 may wait a given period of time in order to collectively transmit the sensor data as much as possible, rather than immediately transmitting the received sensor data to the concentrator 200.

By collectively transmitting sensor data as much as possible as described above, it is possible to reduce a data amount of a transmission message and reduce the number of times of transmission, thereby increasing a sleep time of the node 100 (a time during which the node operates in a power saving mode), resulting in an improvement in battery life.

Although not illustrated in FIG. 8, identification information for identifying sensor data is attached to each piece of the sensor data. The identification information is individually set, for example, for each node 100. The identification information may be information for identifying which sensor 141 of which node 100 the sensor data has acquired from.

Figure 9:
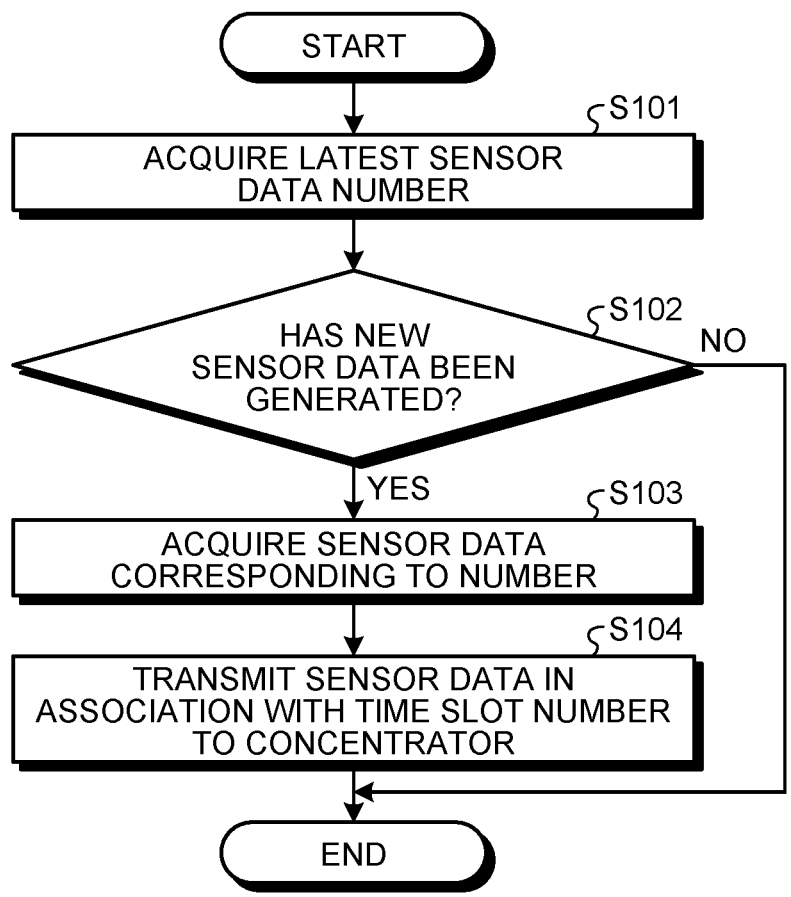
FIG. 9 is a flowchart of data acquisition processing in the present embodiment.

Next, data acquisition processing performed by the node 100 according to the present embodiment configured as described above will be described. FIG. 9 is a flowchart illustrating an example of data acquisition processing in the present embodiment.

The data logger control unit 101 acquires a number of the latest sensor data from each of the data loggers 131, for example, at a polling timing (Step S101). The data logger control unit 101 determines whether or not new sensor data has been generated, on the basis of whether or not the acquired number is different from a previously acquired number (Step S102).

Upon determining that new sensor data has been generated (Step S102: Yes), the data logger control unit 101 acquires sensor data corresponding to the acquired number from each of the data loggers 131 (Step S103). Note that the determination of whether new sensor data has been generated and the acquisition of new sensor data are performed for each of the data loggers 131.

The communication control unit 110 generates a transmission message in which the acquired sensor data is associated with a time slot number of a timing when the sensor data is acquired, and transmits the transmission message to the concentrator 200 as a destination (Step S104).

The communication control unit 110 may transmit the transmission message including the acquired sensor data as it is, or may transmit the sensor data whose data format is changed. For example, the sensor data may be transmitted after being changed into an offset binary format. In order to reduce a data amount, only part of the sensor data may be transmitted. For example, in a case where the acquired sensor data is represented by a count value that increases by one, only a predetermined number of lower digits of the sensor data may be transmitted.

As described above, the communication control unit 110 may generate and transmit a transmission message in which pieces of sensor data are collected. Moreover, in a case where a node receives a transmission message to be relayed from another node 100 to the concentrator 200, the communication control unit 110 may transmit sensor data included in the transmission message received from another node 100 together with the sensor data acquired in Step S103.

After the sensor data is transmitted or when no new sensor data has been generated (Step S102: No), the data acquisition processing ends.

As described above, according to the present embodiment, each of the nodes 100 can notify the concentrator 200 of a sensor data generation time by transmitting a time slot number corresponding to a time, rather than transmitting time data itself. As a result, it is possible to transmit data indicating a time in a smaller data amount than transmitting time data itself. The node 100 can further reduce a time required for wireless transmission and increase a sleep time, so that power consumption can be reduced.

First Modification

The communication system may include a relay node (relay device). The relay node is a node having a function of relaying (transferring) sensor data transmitted from another node 100. The relay node may not include, for example, some of or all functions for acquiring sensor data (the functions of the data logger interface 122 and the data logger control unit 101), out of the functions of the components of the node 100 in FIG. 5.

The node 100 having the configuration illustrated in FIG. 5 may operate as a relay node. For example, the node 100 may operate as a relay node when the node 100 detects that the data logger 131 is not connected to the node 100 at the time of starting up. Moreover, the node 100 may operate as a relay node in a case where its operation mode is set in advance to operate as a relay node.

Second Modification

Figure 10:
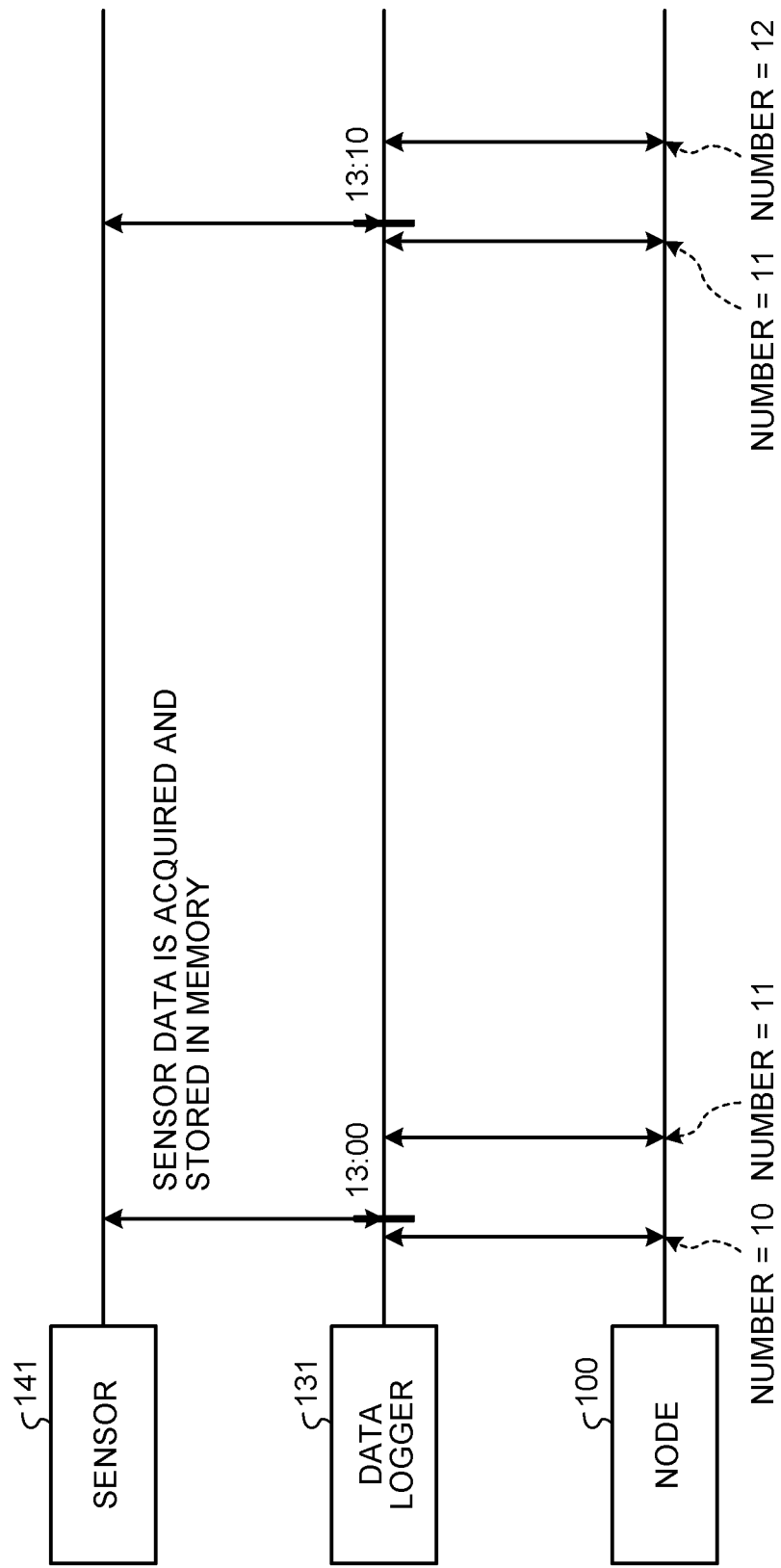
FIG. 10 is a diagram for explaining an example of polling according to a second modification.

The node 100 (the data logger control unit 101) may perform polling only near the timing at which the data logger 131 records sensor data in the internal memory. That is, the data logger control unit 101 may set a polling interval in accordance with an interval at which the data logger 131 records sensor data in the internal memory. FIG. 10 is a diagram for explaining an example of polling performed by the node 100 according to the second modification configured as described above.

For example, when the data logger 131 records sensor data in the internal memory every 10 minutes, the data logger control unit 101 performs polling only near the recording timing. As a result, it is possible to increase a sleep time of the node 100 and the data logger 131, thereby further reducing power consumption. The interval at which the data logger 131 records sensor data in the internal memory is set in the node 100, for example, in advance.

The data logger control unit 101 may be configured to learn an interval (timing) at which the data logger 131 records sensor data in the internal memory by using, for example, information on a timing at which new sensor data is obtained. In this case, for example, immediately after starting up, the data logger control unit 101 operates in a state where the number of times polling is performed has been increased as illustrated in FIG. 7. When the interval at which sensor data is recorded in the internal memory is obtained by learning, the data logger control unit 101 decreases the number of times of polling to correspond to the learned interval.

The learning of the interval (timing) at which the data logger 131 records sensor data in the internal memory can also be interpreted as learning a start time at which transmission of request for acquiring sensor data (polling) is started.

In addition, in a case where no new sensor data has been obtained from the data logger 131 during operation, the data logger control unit 101 may return to the same state as immediately after started up and increase the number of times polling is performed to learn a timing again.

Third Modification

Figure 11:
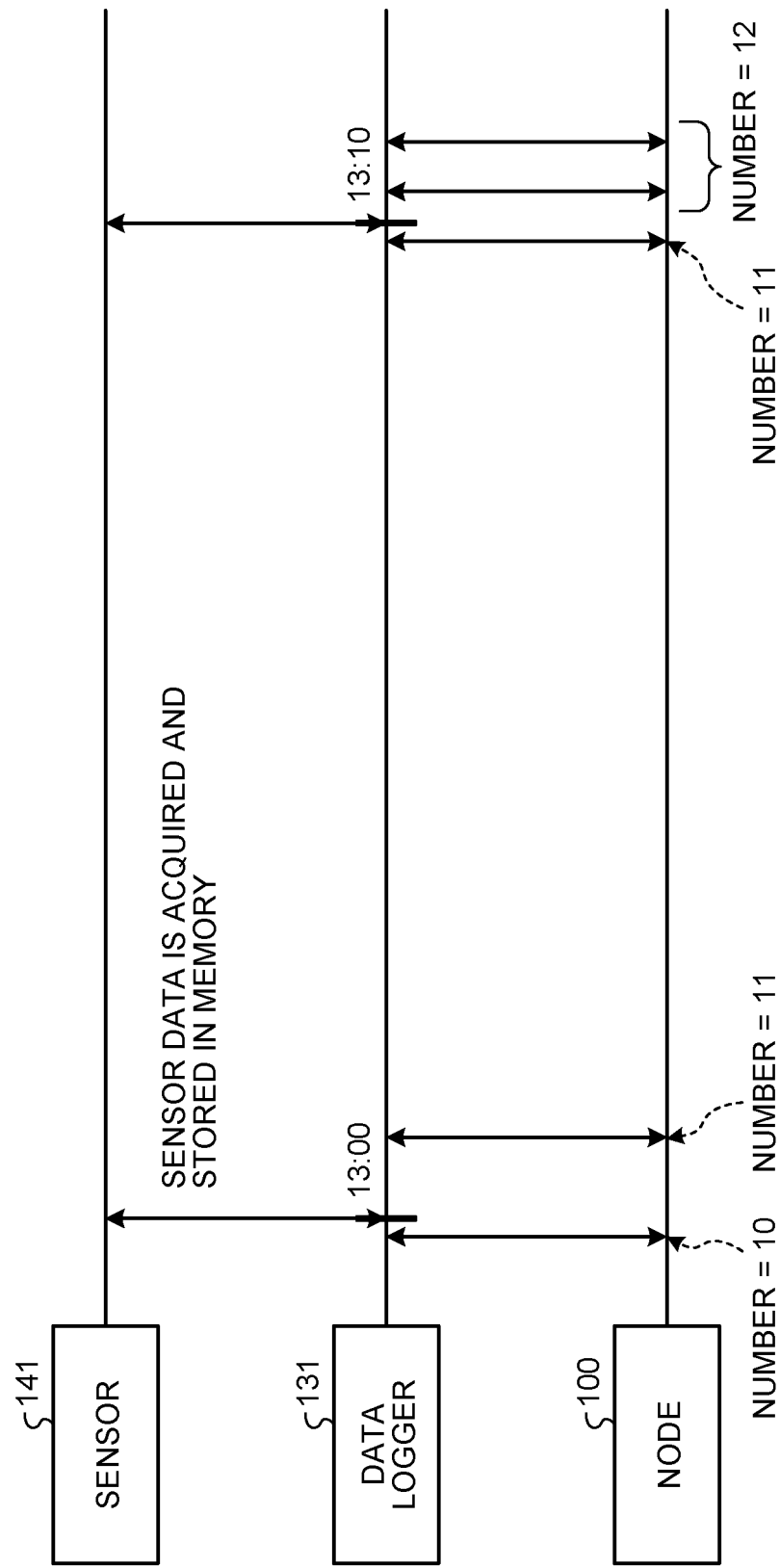
FIG. 11 is a diagram for explaining an example of polling according to a third modification.

The node 100 may shorten a polling interval near the timing at which the data logger 131 records sensor data in the internal memory. As a result, it is possible to obtain a time slot number closer to the sensor data generation time. FIG. 11 is a diagram for explaining an example of polling performed by the node 100 according to the third modification configured as described above.

For example, the data logger control unit 101 first operates in a state where a relatively long polling interval is set, and learns a timing at which the data logger 131 records sensor data in the internal memory as in the second modification. After learning such a timing, the data logger control unit 101 shortens a polling interval and performs polling only near the learned timing.

Similarly to the second modification described above, in a case where no new sensor data has been obtained from the data logger 131 during operation or the like, the data logger control unit 101 may return to the same state as immediately after started up to learn a timing again.

Fourth Modification

The node 100 (the data logger control unit 101) may be configured to be able to obtain current sensor data from the sensor 141 connected to the data logger 131, as well as the sensor data recorded in the internal memory of the data logger 131. For example, the data logger control unit 101 makes a request to the data logger 131 for acquiring current sensor data, and acquires the current sensor data acquired from the sensor 141 and transmitted by the data logger 131 without being recorded in the internal memory. The node 100 (the communication control unit 110) transmits a time slot number as a generation time of the obtained current sensor data.

Fifth Modification

The node 100 may be configured to acquire, without performing polling, sensor data transmitted to the node 100 via the data logger interface 122 when the data logger 131 records the sensor data in the internal memory. The node 100 transmits a current time slot number as a generation time for the received sensor data. At this time, in a case where pieces of sensor data generated at the same time are transmitted from the data logger 131 for some reason, the node 100 (the communication control unit 110) may transmit the sensor data to the concentrator 200 only once.

For example, the communication control unit 110 determines whether or not pieces of sensor data are generated at the same generation time with reference to generation times assigned to the sensor data, and transmits any one of the pieces of sensor data generated at the same generation time to the concentrator 200.

When the data logger 131 records sensor data in the internal memory, only information indicating that new sensor data has been recorded may be transmitted to the node 100 via the data logger interface 122. In this case, when the information indicating that new sensor data has been recorded is received, the node 100 may obtain the new sensor data from the data logger 131, for example, by polling.

Sixth Modification

There is a possibility that the time managed in the data logger 131 may return to a previous time due to time correction or the like. In such a case, sensor data may be recorded in the internal memory of the data logger 131 multiple times at the substantially same timing. However, the sensor data is recorded multiple times at the substantially same timing, so that it may not be necessary to transmit all the sensor data in the wireless multi-hop network. Therefore, the node 100 checks a generation time of sensor data obtained by polling, and, as a result, when the generation time is the same as that of sensor data transmitted at an immediately previous timing, the node 100 does not need to transmit the sensor data.

Seventh Modification

So far, each example in which a time slot number is used as a number indicating a communication timing has been mainly described. Alternatively, a slot frame number may be used as a number indicating a communication timing.

Figure 12:
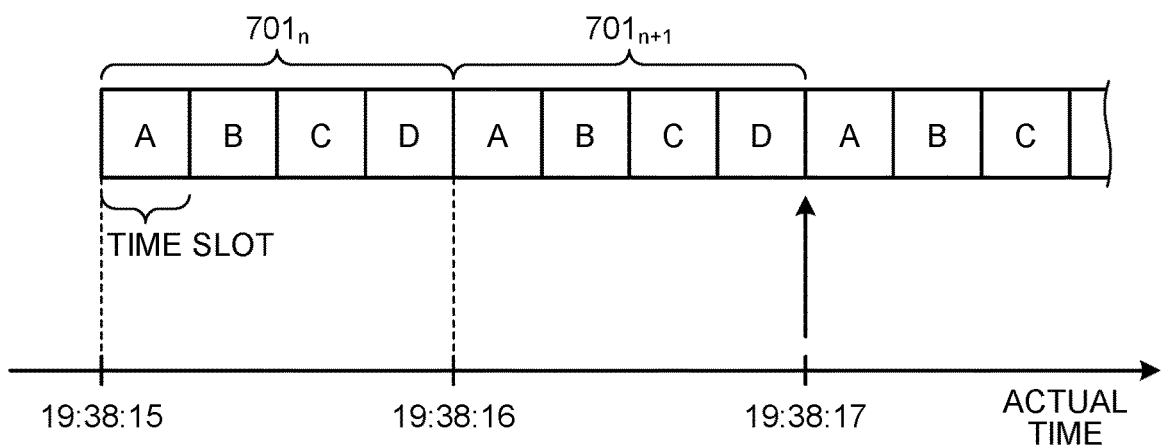
FIG. 12 is a diagram illustrating a relationship between an actual time and a time-division multiplexing slot frame.

FIG. 12 is a diagram illustrating a relationship between an actual time and a time-division multiplexing slot frame. The slot frame is a unit of a schedule including a certain number of time slots. In FIG. 12, slot frames $701_n$ and $701_{n+1}$ each include four time slots. Similarly to the time slot, a slot frame number is assigned to the slot frame. By using the slot frame number, it is possible to collectively transmit more sensor data.

Eighth Modification

Figure 13:
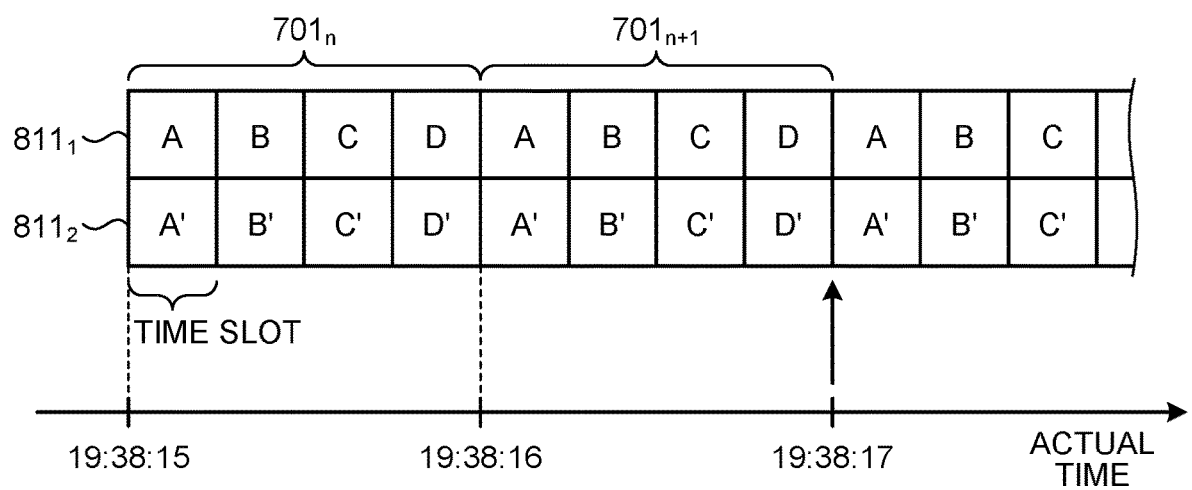
FIG. 13 is a diagram illustrating a relationship between an actual time and a time-division multiplexing slot frame.

One or more channels (frequencies) may be used in a time-division multiplexing technique. For example, in TSCH, a channel used is changed every time data is transmitted or received. The method according to the above-described embodiment can also be applied to such a time-division multiplexing technique. FIG. 13 is a diagram illustrating a relationship between a relationship between an actual time and a time-division multiplexing slot frame in a case where two channels $811_1$ and $811_2$ are used.

In such a time-division multiplex communication schedule, a channel used for communication is designated in addition to a time slot number. The channel may be designated with a channel offset. The concentrator 200 and the node 100 transmit and receive sensor data by the designated channel.

Ninth Modification

A super frame number may be used as a number indicating a communication timing.

Figure 14:
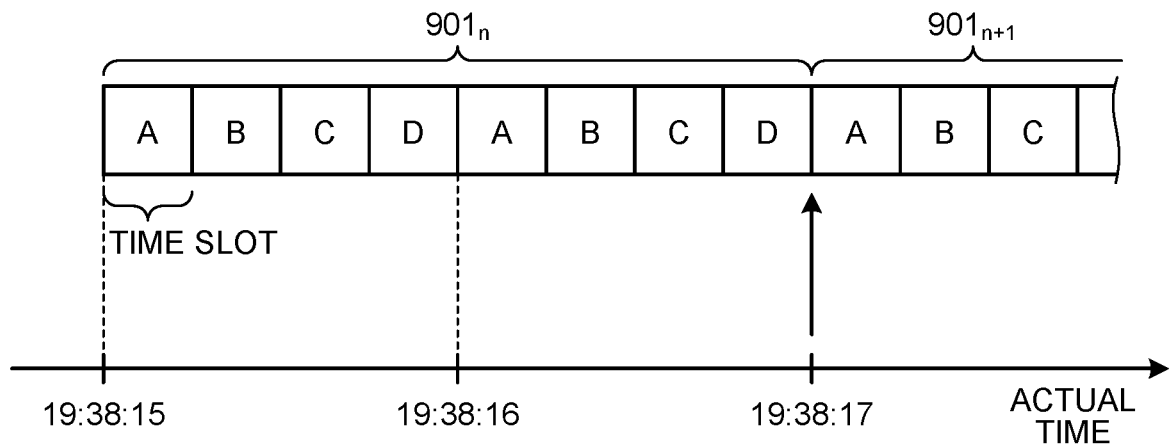
FIG. 14 is a diagram illustrating a relationship between an actual time and a time-division multiplexing super frame.

FIG. 14 is a diagram illustrating a relationship between an actual time and a time-division multiplexing super frame. The super frame is a unit of a schedule including a given number of slot frames. In FIG. 14, super frames $901_n$ and $901_{n+1}$ each include two slot frames. A super frame number is assigned to the super frame. By using the super frame number, it is possible to collectively transmit more sensor data.

The super frame has a longer period than the time slot. Therefore, in order to notify a time with higher accuracy, the node 100 may transmit an offset of a time slot in the super frame in addition to the super frame number. The offset of the time slot is, for example, an offset with respect to the initial time slot of the super frame. For example, the communication control unit 110 transmits, to the concentrator 200, sensor data in which the super frame number and the offset of the time slot in the super frame are associated with each other as data indicating a time.

Tenth Modification

Rather than transmitting a time slot number itself, a slot frame number itself, or a super frame number itself, each corresponding to a timing at which sensor data is acquired, the node 100 (the communication control unit 110) may transmit a difference between the time slot number, the slot frame number, or the super frame number and a current time slot number, a current slot frame number, or a current super frame number, respectively, each corresponding to a time point when a message is processed (an example of a second number).

Such a current time slot number, a current slot frame number, or a current super frame number may already be included in a message transmitted or be received in the wireless multi-hop network. The communication control unit 110 then transmits only a difference from the already-included number as data indicating a time. As a result, it is possible to further reduce an amount of data to be transmitted.

As described above, in the communication system according to the present embodiment, a number indicating a communication timing used in a communication technique such as a time-division multiplexing technique is used in place of a time at which output data such as sensor data is generated. This makes it possible to reduce an amount of data required when the output data is transmitted.

Figure 15:
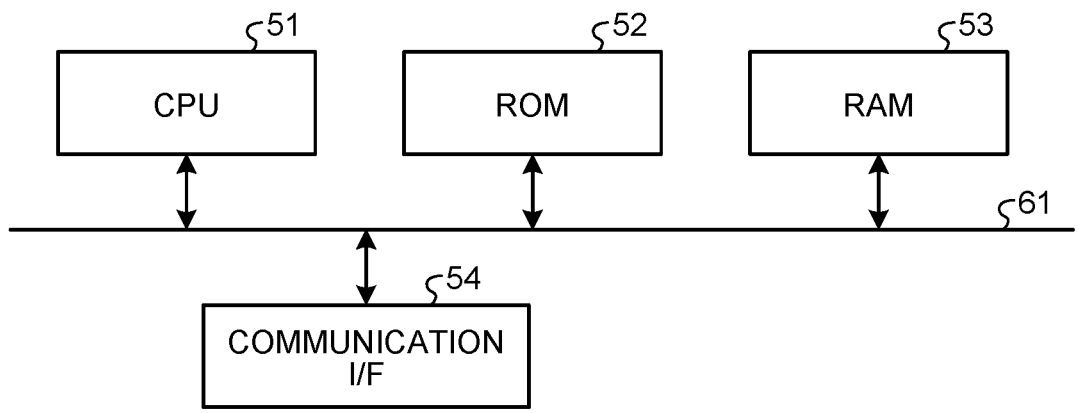
FIG. 15 is a hardware configuration diagram of a device according to an embodiment.

Next, a hardware configuration of the device (the concentrator and the node) according to the embodiment will be described with reference to FIG. 15. FIG. 15 is an explanatory diagram illustrating an example of the hardware configuration of the device according to the embodiment.

The device according to the embodiment includes a control device such as a CPU 51, storage devices such as a read only memory (ROM) 52 and a random access memory (RAM) 53, a communication I/F 54 connected to a network to perform communication, and a bus 61 connecting the aforementioned units to each other.

A computer program to be executed by each device according to the embodiment is installed in advance in the ROM 52 or the like.

The program to be executed by the device according to the embodiment may be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Moreover, the program to be executed by the device according to the embodiment may be stored on a computer connected to a network such as the Internet, and provided by being downloaded via the network. Alternatively, the program to be executed by the device according to the embodiment may be provided or distributed via a network such as the Internet.

The program to be executed by the device according to the embodiment may cause a computer to function as each unit of the above-described device. In this computer, the CPU 51 can read the program from a computer-readable storage medium onto a main storage device to execute the program.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
one or more hardware processors configured to:
acquire, from at least one electronic device, output data output from the electronic device;
communicate with a server device by a communication technique in which numbers indicating communication timings are synchronized, and
transmit, to the server device as a destination, the output data in association with a first number out of the numbers, the first number indicating a timing at which the output data is acquired,
wherein the one or more hardware processors
receive the output data in association with the first number from an external communication device serving to perform communication by the communication technique, and
transmit, to the server device as a destination, pieces of the output data whose first numbers are the same as one another out of the output data received from the external communication device and the output data acquired from the at least one electronic device, the pieces of the output data being transmitted in association with the same first number.

2. A communication device comprising:
one or more hardware processors configured to:
acquire, from at least one electronic device, output data output from the electronic device;
communicate with a server device by a communication technique in which numbers indicating communication timings are synchronized, and
transmit, to the server device as a destination, the output data in association with a first number out of the numbers, the first number indicating a timing at which the output data is acquired,
wherein the one or more hardware processors
transmit the output data to the server device as a destination via a relay device serving to relay communication between the communication device and the server device, and
transmit, to the server device as a destination, pieces of the output data whose first numbers are the same as one another out of pieces of the output data received from devices including the at least one electronic device and an external communication device serving to perform communication by the communication technique, the pieces of the output data being transmitted to the server device as a destination via the relay device serving to transmit, to the server device as a destination, the pieces of the output data in association with the same first number.

3. A communication device comprising:
one or more hardware processors configured to:
acquire, from at least one electronic device, output data output from the electronic device;
communicate with a server device by a communication technique in which numbers indicating communication timings are synchronized, and transmit, to the server device as a destination, the output data in association with a first number out of the numbers, the first number indicating a timing at which the output data is acquired, wherein the one or more hardware processors make a request to the at least one electronic device for the output data at designated time intervals, acquire the output data transmitted in response to the request, learn, on the basis of the acquired output data, a start time for starting transmission of the request, and transmit the request at the time intervals from the learned start time.

4. The communication device according to 3, wherein the one or more hardware processors transmit the request at shortened time intervals from the learned start time.

5. A communication device comprising:

one or more hardware processors configured to:

acquire, from at least one electronic device, output data output from the electronic device;

communicate with a server device by a communication technique in which numbers indicating communication timings are synchronized, and transmit, to the server device as a destination, the output data in association with a first number out of the numbers, the first number indicating a timing at which the output data is acquired, wherein the one or more hardware processors transmit, to the server device as a destination, the first number in association with the output data, the first number indicating a difference between the number indicating a timing at which the output data is acquired and a second number indicating a communication timing of transmission data for transmitting the output data.

6. A communication device comprising:

one or more hardware processors configured to:

acquire, from at least one electronic device, output data output from the electronic device;

communicate with a server device by a communication technique in which numbers indicating communication timings are synchronized, and transmit, to the server device as a destination, the output data in association with a first number out of the numbers, the first number indicating a timing at which the output data is acquired, wherein the communication technique is a time-division multiplexing technique, the numbers are each a super frame number managed by the time-division multiplexing technique, and the one or more hardware processors transmit, to the server device as a destination, the output data with which the super frame number and an offset of a time slot in a super frame are associated as the first number.

\* \* \* \* \*